United States Patent
Okamura et al.

(10) Patent No.: US 9,669,727 B2
(45) Date of Patent: Jun. 6, 2017

(54) ELECTRICAL SOURCE CONTROL APPARATUS

(71) Applicant: TOYOTA JIDOSHA KABUSHIKI KAISHA, Toyota-shi (JP)

(72) Inventors: Masaki Okamura, Toyota (JP); Naoyoshi Takamatsu, Sunto-gun (JP); Takaji Umeno, Nagakute (JP); Shuji Tomura, Nagakute (JP); Masanori Ishigaki, Nagakute (JP); Naoki Yanagizawa, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/778,725

(22) PCT Filed: Mar. 19, 2014

(86) PCT No.: PCT/JP2014/057575
§ 371 (c)(1),
(2) Date: Sep. 21, 2015

(87) PCT Pub. No.: WO2014/148563
PCT Pub. Date: Sep. 25, 2014

(65) Prior Publication Data
US 2016/0046203 A1 Feb. 18, 2016

(30) Foreign Application Priority Data
Mar. 22, 2013 (JP) .................... 2013-059654

(51) Int. Cl.
*B60L 11/18* (2006.01)
*B60L 3/00* (2006.01)
(Continued)

(52) U.S. Cl.
CPC ......... *B60L 11/1862* (2013.01); *B60L 3/0046* (2013.01); *B60L 7/14* (2013.01);
(Continued)

(58) Field of Classification Search
None
See application file for complete search history.

(56) References Cited

U.S. PATENT DOCUMENTS 6,523,626 B2 * 2/2003 Wakashiro ............. B60K 6/485
180/65.26
8,138,720 B2 * 3/2012 Snyder ................... B60K 6/448
307/44

(Continued)

FOREIGN PATENT DOCUMENTS

JP      5 30608      2/1993
JP      7 245808      9/1995
(Continued)

OTHER PUBLICATIONS

International Search Report Issued Jun. 24, 2014 in PCT/JP14/057575 Filed Mar. 19, 2014.

*Primary Examiner* — Redhwan K Mawari
*Assistant Examiner* — Edward Torchinsky
(74) *Attorney, Agent, or Firm* — Oblon, McClelland, Maier & Neustadt, L.L.P.

(57) ABSTRACT

An electrical source control apparatus controls a vehicle which travels by using an electrical source system including a first electrical source and a second electrical source. The electrical source control apparatus has: a controlling device for controlling the first and second electrical sources to set a residual power level of the first electrical source equal to first target amount and to set a residual power level of the second electrical source equal to second target amount, and a setting device for setting the first and second target amounts such that each of the first and second target (Continued)

amounts becomes smaller as a speed of the vehicle becomes larger. The setting device sets the first and second target amounts such that a rate of change of the second target amount to the speed is larger than a rate of change of the first target amount to the speed.

6 Claims, 5 Drawing Sheets

(51) Int. Cl.
  *B60L 7/14* (2006.01)
  *B60L 11/00* (2006.01)
  *H02J 7/14* (2006.01)
  *H02J 7/34* (2006.01)

(52) U.S. Cl.
  CPC ............ *B60L 11/005* (2013.01); *B60L 11/18* (2013.01); *B60L 11/1803* (2013.01); *B60L 11/1868* (2013.01); *H02J 7/1438* (2013.01); *B60L 2210/10* (2013.01); *B60L 2240/12* (2013.01); *H02J 7/345* (2013.01); *Y02T 10/7005* (2013.01); *Y02T 10/7022* (2013.01); *Y02T 10/7044* (2013.01); *Y02T 10/7066* (2013.01); *Y02T 10/7216* (2013.01)

(56) References Cited

U.S. PATENT DOCUMENTS

| | | | |
|---|---|---|---|
| 2012/0119574 A1* | 5/2012 | Sone | B60L 11/005 307/10.1 |
| 2016/0039306 A1* | 2/2016 | Okamura | H02J 7/345 701/22 |

FOREIGN PATENT DOCUMENTS

| | | |
|---|---|---|
| JP | 2005 160154 | 6/2005 |
| JP | 2012 23803 | 2/2012 |
| JP | 2012 95428 | 5/2012 |
| JP | 2012 110071 | 6/2012 |

\* cited by examiner

# ELECTRICAL SOURCE CONTROL APPARATUS

TECHNICAL FIELD

The present invention relates to an electrical source control apparatus for controlling a vehicle which travels by using an electrical source system including two types of electrical sources, for example.

BACKGROUND ART

A vehicle (for example, an Electrical Vehicle or a Hybrid Vehicle) which has an electrical source system including two types of electrical sources is proposed (see Patent Literatures 1 to 3). An electrical source which is capable of discharging (namely, outputting) a constant electrical power over a long time and an electrical source which is capable of performing a rapid discharge/charge (namely, output/input) are used as two types of electrical sources, for example.

Here, the Patent Literature 1 discloses a control method by which all of a required output for the discharge is satisfied by the output of a battery, if the required output for the discharge which is required for an electrical source apparatus is equal to or less than a maximum output of the battery in a power-running state. Moreover, the Patent Literature 1 discloses a control method by which the excess of the required output for the discharge which is more than the maximum output of the battery is satisfied by the output of a capacitor (alternatively, all of the required output for the discharge is satisfied by the output of the capacitor), if the required output for the discharge which is required for the electrical source apparatus is more than the maximum output of the battery. This control method prevents a rapid discharge from the battery and thus suppresses a deterioration of the battery.

Moreover, the Patent Literature 2 discloses a control method which increases a share (rate) of the charge to a large capacity type of condenser by restricting the charge to a battery, when a braking (a regeneration) is performed. This control method prevents a rapid charge to the battery and thus suppresses a deterioration of the battery.

Incidentally, the Patent Literature 3 discloses a control method which supplies an electrical power stored in a capacitor to a load, if a voltage of the capacitor is equal to or more than a predetermined voltage over a time period after an engine of a vehicle stops and before a predetermined time T1 elapses. This control method prevents the capacitor from remaining in a high-voltage state which is close to its rating and thus allows the capacitor to operate in longer time period.

CITATION LIST

Patent Literature

Patent Literature 1: Japanese Patent Application Laid Open No. Hei7-245808
Patent Literature 2: Japanese Patent Application Laid Open No. Hei5-30608
Patent Literature 3: Japanese Patent Application Laid Open No. 2012-110071

SUMMARY OF INVENTION

Technical Problem

By the way, the Patent Literature 1 discloses a technology which sets a maximum charged amount for the capacitor such that the maximum charged amount for the capacitor becomes smaller as a speed of the vehicle becomes larger. However, the Patent Literature 1 does not disclose how to set the maximum charged amount for the battery whose characteristic is different from that of the capacitor. Namely, the patent Literature 1 does not disclose how to effectively use the battery and the capacitor whose characteristics are different from each other. Therefore, there is a possibility that the battery and the capacitor cannot be used effectively, which is a technical problem. As a result, there is a possibility that a driving performance (traveling performance), a fuel efficiency or the like deteriorates.

The subject to be solved by the present invention includes the above as one example. It is therefore an object of the present invention to provide an electrical source control apparatus which is capable of using two types of electrical sources more effectively in a vehicle having two types of electrical sources.

Solution to Problem

<1>

In order to solve the above described problem, an electrical source control apparatus of the present invention is an electrical source control apparatus for controlling a vehicle which travels by using an electrical source system including both of a first electrical source and a second electrical source whose capacity is smaller than that of the first electrical source and whose output is larger than that of the first electrical source, the electrical source control apparatus is provided with: a controlling device configured to control the first and second electrical sources to set a residual power level of the first electrical source equal to a first target amount and to set a residual power level of the second electrical source equal to a second target amount; and a setting device configured to set each of the first and second target amounts such that each of the first and second target amounts becomes smaller as a speed of the vehicle becomes larger, the setting device setting each of the first and second target amounts such that a rate of change of the second target amount to the speed of the vehicle is larger than a rate of change of the first target amount to the speed of the vehicle.

The electrical source control apparatus of the present invention is capable of controlling the vehicle which travels by using the electrical source system including both of the first and second electrical sources.

The vehicle which travels by using the above described electrical source system typically travels by using an electrical power outputted from the electrical source system, when the vehicle is in a power-running state. Specifically, for example, the vehicle travels by using a driving power of a rotating electrical machine which operates by using the electrical power outputted from the electrical source system. As a result, one or both of the first and second electrical sources often outputs the electrical power (namely, discharges) when the vehicle is in the power-running state. On the other hand, the vehicle travels while inputting the electrical power into the electrical source system, when the vehicle is in a regeneration state. Specifically, for example, the vehicle travels while inputting the electrical power, which is generated by the regeneration of the rotating electrical machine, into the electrical source system. As a result, the electrical power is often inputted to (namely, charges) one or both of the first and second electrical sources when the vehicle is in the regeneration state.

Here, the first electrical source is an electrical source (what we call a high capacity type electrical source) whose capacity is larger than the capacity of the second electrical source. Therefore, the first electrical source is capable of outputting the constant electrical power over a longer time than the second electrical source. On the other hand, the second electrical source is an electrical source (what we call a high output (high power) type electrical source) whose output is larger than the output of the first electrical source. Therefore, the second electrical source is capable of performing an input/output of the electrical power more rapidly than the first electrical source.

Incidentally, a battery may be used as the first electrical source and a capacitor (in other words, a condenser) may be used as the second electrical source, for example. Alternatively, a high capacity type battery (namely, a battery whose capacity is larger than that of a high output type battery) may be used as the first electrical source and the high output type battery (namely, a battery whose output is larger than that of the high capacity type battery) may be used as the second electrical source, for example. Alternatively, a high capacity type capacitor (namely, a capacitor whose capacity is larger than that of a high output type capacitor) may be used as the first electrical source and the high output type capacitor (namely, a capacitor whose output is larger than that of the high capacity type capacitor) may be used as the second electrical source, for example.

In order to control the above described vehicle (in other words, the electrical source system which the above described vehicle is provided with), the electrical source control apparatus of the present invention is provided with the controlling device and the setting device.

The controlling device controls the first and second electrical sources to set the residual power level of the first electrical source (namely, a residual amount of the electrical power which is stored in the first electrical source, and a SOC (State Of Charge) for example) equal to the first target amount (in other words, to make the residual power level of the first electrical source follow up the first target amount). Namely, the controlling device controls the first and second electrical sources such that a difference between the residual power level of the first electrical source and the first target amount becomes smaller (preferably, becomes zero). Incidentally, the controlling device may control the first and second electrical sources such that at least one of an input (namely, charge) of a predetermined amount of the electrical power into the first electrical source and an output (namely, discharge) of a predetermined amount of the electrical power from the first electrical source is performed, in order to set the residual power level of the first electrical source equal to the first target amount.

The controlling device similarly controls the first and second electrical sources to set the residual power level of the second electrical source (namely, a residual amount of the electrical power which is stored in the second electrical source, and a SOC (State Of Charge) for example) equal to the second target amount (in other words, to make the residual power level of the second electrical source follow up the second target amount). Namely, the controlling device controls the first and second electrical sources such that a difference between the residual power level of the second electrical source and the second target amount becomes smaller (preferably, becomes zero). Incidentally, the controlling device may control the first and second electrical sources such that at least one of an input (namely, charge) of a predetermined amount of the electrical power into the second electrical source and an output (namely, discharge) of a predetermined amount of the electrical power from the second electrical source is performed, in order to set the residual power level of the second electrical source equal to the second target amount.

The setting device sets the first and second target amounts, which the controlling device uses, on the basis of the speed of the vehicle. Specifically, the setting device sets the first target amount such that the first target amount becomes smaller as the speed of the vehicle becomes larger. The setting device similarly sets the second target amount such that the second target amount becomes smaller as the speed of the vehicle becomes larger. The reason is that the first and second electrical sources preferably store the electrical power which is used by the vehicle to start traveling (alternatively, to accelerate), namely the residual power level is preferably large relatively, when the speed of the vehicle is relatively small. Moreover, the reason is that the first and second electrical sources preferably have space to additionally store the electrical power which is generated by the regeneration, namely the residual power level is preferably small relatively, when the speed of the vehicle is relatively large.

Especially, the setting device sets the first and second target amounts such that the rate of the change of the second target amount to the speed of the vehicle is different from the rate of the change of the first target amount to the speed of the vehicle. Specifically, the setting device sets the first and second target amounts such that the rate of the change of the second target amount to the speed of the vehicle is larger than the rate of the change of the first target amount to the speed of the vehicle. Namely, the setting device sets the first and second target amounts such that a decreased amount of the second target amount in the case where the speed of the vehicle increases by a predetermined amount is larger than a decreased amount of the first target amount in the case where the speed of the vehicle increases by same amount (namely, the predetermined amount). In other words, the setting device sets the first and second target amounts such that the second target amount becomes smaller more rapidly (alternatively, drastically or exponentially) as the speed of the vehicle becomes larger and the first target amount becomes smaller more slowly as the speed of the vehicle becomes larger.

As a result, the second target amount becomes smaller more rapidly than the first target amount, when the vehicle accelerates (namely, the speed of the vehicle becomes larger). Thus, the controlling device is capable of controlling the first and second electrical sources such that the residual power level of the second electrical source becomes smaller more rapidly than the residual power level of the first electrical source. Namely, the electrical source control apparatus of the present invention allows the second electrical source to output the electrical power more preferentially (in other words, more actively) when the vehicle accelerates, compared to an electrical source control apparatus of a comparison example by which the rate of the change of the second target amount is not larger than the rate of the change of the first target amount.

The controlling device is similarly capable of controlling the first and second electrical sources to maintain a condition that the residual power level of the second electrical source is relatively small, when the vehicle travels at a constant speed (namely, the speed of the vehicle is relatively large and does not vary greatly). Namely, the electrical source control apparatus of the present invention allows the second electrical source to have more space to additionally store the electrical power which is generated by the future regeneration when the vehicle travels at the constant speed, compared to the electrical source control apparatus of the comparison example by which the rate of the change of the second target amount is not larger than the rate of the change of the first target amount.

Moreover, the second target amount becomes larger more rapidly than the first target amount, when the vehicle decelerates (namely, the speed of the vehicle becomes smaller). Thus, the controlling device is capable of controlling the first and second electrical sources such that the residual power level of the second electrical source becomes larger more rapidly than the residual power level of the first electrical source. Namely, the electrical source control apparatus of the present invention allows the electrical power which is generated by the regeneration due to the deceleration to be inputted to the second electrical source more preferentially (in other words, more actively) when the vehicle decelerates, compared to the electrical source control apparatus of the comparison example by which the rate of the change of the second target amount is not larger than the rate of the change of the first target amount.

As described above, the electrical source control apparatus of the present invention is capable of increasing a ratio of the electrical power which the second electrical source inputs/outputs to the electrical power which the electrical source system should input/output, especially when the speed of the vehicle varies, compared to the electrical source control apparatus of the comparison example by which the rate of the change of the second target amount is not larger than the rate of the change of the first target amount. For example, the electrical source control apparatus of the present invention is capable of increasing a ratio of the electrical power which the second electrical source outputs to a required output of the electrical power (namely, the electrical power which the electrical source system should output), when the speed of the vehicle increases, compared to the electrical source control apparatus of the comparison example. For example, the electrical source control apparatus of the present invention similarly is capable of increasing a ratio of the electrical power which is inputted to the second electrical source to the regenerated electrical power (namely, the electrical power which should be inputted to the electrical source system), when the speed of the vehicle decreases (namely, the vehicle regenerates), compared to the electrical source control apparatus of the comparison example. Namely, the electrical source control apparatus of the present invention is capable of using the electrical power which the second electrical source inputs/outputs more effectively (in other words, more preferentially or more actively), compared to the electrical source control apparatus of the comparison example by which the rate of the change of the second target amount is not larger than the rate of the change of the first target amount.

Here, an efficiency of the input/output of the electrical power to/from the second electrical source is generally better than an efficiency of the input/output of the electrical power to/from the first electrical source, because the capacity of the second electrical source is relatively small and the output of the second electrical source is relatively large. Thus, a fuel efficiency becomes better as the ratio of the electrical power which the second electrical source inputs/outputs becomes larger. Thus, the electrical source control apparatus of the present invention is capable of improving the fuel efficiency of the vehicle, compared to the electrical source control apparatus of the comparison example by which the rate of the change of the second target amount is not larger than the rate of the change of the first target amount, because the electrical source control apparatus of the present invention is capable of using the electrical power which the second electrical source inputs/outputs more effectively.

As described above, the electrical source control apparatus of the present invention is capable of effectively using first and second electrical sources whose characteristics are different from each other by differentiating the rate of the change of the second target amount and the rate of the change of the first target amount.

<2>

In another aspect of the electrical source control apparatus of the present invention, the electrical source control apparatus is further provided with a predicting device configured to predict whether or not a ready-off command for stopping an operation of the vehicle is issued, the setting device further sets the second target amount such that the second target amount which is used when it is predicted that the ready-off command is issued becomes smaller than the second target amount which is used when it is not predicted that the ready-off command is issued.

According to this aspect, the predicting device predicts whether or not the ready-off command is issued. It is preferable that the predicting device predict whether or not the ready-off command is issued before the ready-off command is actually issued. Here, the "ready-off command" means a command for stopping the electrical source system which the vehicle is provided with. Therefore, the vehicle in which the electrical source system stops traveling after the ready-off command is issued.

The setting device further sets the second target amount such that the second target amount which is used when it is predicted that the ready-off command is issued becomes smaller than the second target amount which is used when it is not predicted that the ready-off command is issued.

Here, if the residual power level of the second electrical source is relatively large (for example, the residual power level of the second electrical source is a rated upper limit value or is close to the rated upper limit value) at the timing when the electrical source system stops, the second electrical source remains in a condition that the residual power level is relatively large. If the second electrical source remains in the condition that the residual power level is relatively large, a lifetime of the second electrical source decreases (alternatively, the second electrical source deteriorates) easily.

However, even if there is a possibility that the lifetime of the second electrical source decreases, the setting device is capable of further setting the second target amount to decrease the second target amount before the ready-off command is actually issued (in other words, before the electrical source system stops) in this aspect. As a result, the residual power level of the second electrical source decreases before the ready-off command is actually issued (in other words, before the electrical source system stops). Namely, the residual power level of the second electrical source becomes small at the timing when the ready-off command is actually issued (in other words, before the electrical source system actually stops). Thus, a decrease of the lifetime of the second electrical source is suppressed appropriately.

<3>

In another aspect of the above described electrical source control apparatus which is provided with the predicting device, the predicting device predicts that the ready-off command is issued, if a range of an operational lever for operating a transmission is changed to a P range from another range other than the P range.

According to this aspect, the predicting device is capable of appropriately predicting whether or not the ready-off command is issued on the basis of the range of the operational lever for operating the transmission. The reason is that a driver often intends to stop the vehicle (as a result, stop the electrical source system) if the range of the operational lever is changed from another range (for example, a D range or a R range) to the P range.

<4>

In another aspect of the electrical source control apparatus of the present invention, the controlling device controls the first and second electrical sources to prioritize a control of setting the residual power level of the second electrical source equal to the second target amount over a control of setting the residual power level of the first electrical source equal to the first target amount According to this aspect, the controlling device is capable of preferentially performing the control of setting the residual power level of the second electrical source whose output is relatively large equal to the second target amount. As a result, there is little possibility that the second electrical source is depleted (namely, the residual power level is equal to or less than a lower limit value of the residual power level) or the second electrical source has no space to be additionally charged (namely, the residual power level is equal to or more than an upper limit value of the residual power level).

For example, since there is little possibility that the second electrical source is depleted or the second electrical source has no space to be additionally charged, the electrical source control apparatus is capable of increasing the ratio of the electrical power which the second electrical source inputs/outputs to the electrical power which the electrical source system should input/output (namely, effectively using the second electrical source) depending on a driving mode of the vehicle. Here, the efficiency of the input/output of the electrical power to/from the second electrical source is generally better than the efficiency of the input/output of the electrical power to/from the first electrical source, because the capacity of the second electrical source is relatively small and the output of the second electrical source is relatively large. Thus, the fuel efficiency becomes better as the ratio of the electrical power which the second electrical source inputs/outputs to the electrical power which the electrical source system should input/output becomes larger. Thus, the improvement of the fuel efficiency of the vehicle is appropriately achieved in this aspect, because the control of setting the residual power level of the second electrical source whose output is relatively large equal to the second target amount is preferentially performed. Namely, the vehicle is capable of traveling in a driving mode by which the fuel efficiency is prioritized.

Alternatively, since there is little possibility that the second electrical source is depleted or the second electrical source has no space to be additionally charged, the capacity of the second electrical source can be reduced. As a result, a reduction of a cost, a size and the like of the second electrical source can be achieved. Moreover, the electrical power which the electrical source system should output is preferably satisfied by a temporal output of the electrical power from the second electrical source whose output is relatively large, when the electrical source system should temporarily output a large amount of electrical power in order to satisfy a driving performance (for example, to allow the vehicle to accelerate at a relatively large acceleration rate) depending on the driving mode of the vehicle. In this case, since the depletion of the second electrical source is prevented, the second electrical source is capable of easily outputting the electrical power to satisfy the driving performance. In other words, such a situation does not occur easily that the second electrical source is not capable of outputting the electrical power at the timing when the second electrical source should temporarily output the electrical power in accordance with the variation of the electrical power which the electrical source system should output. As a result, it is possible to satisfy a characteristic which prioritizes the driving performance for a longer time. Namely, the vehicle is capable of traveling in a driving mode by which the driving performance is prioritized.

<5>

In another aspect of the electrical source control apparatus which prioritizes the control of setting the residual power level of the second electrical source equal to the second target amount over the control of setting the residual power level of the first electrical source equal to the first target amount, the controlling device controls the first and second electrical sources to prioritize the control of setting the residual power level of the first electrical source equal to the first target amount over the control of setting the residual power level of the second electrical source equal to the second target amount, if a difference between the residual power level of the first electrical source and a limiting value of the residual power level of the first electrical source is less than a predetermined threshold value.

According to this aspect, although the controlling device preferentially performs the control of setting the residual power level of the second electrical source equal to the second target amount as a general case, the controlling device is capable of preferentially performing the control of setting the residual power level of the first electrical source equal to the first target amount as an exceptional case. Namely, the controlling device is capable of preferentially performing the control of setting the residual power level of the first electrical source equal to the first target amount as the exceptional case in order to prevent the first electrical source from depleting or having no space to be additionally charged, when the residual power level of the first electrical source is close to the limiting value.

Incidentally, it is preferable that the "threshold value" be set to an appropriate value which can distinguish a relationship of the priority between the control of setting the residual power level of the first electrical source equal to the first target amount and the control of setting the residual power level of the second electrical source equal to the second target amount while a specification of each of the first and second electrical sources is considered.

<6>

In another aspect of the electrical source control apparatus of the present invention, the controlling device controls the first and second electrical sources to set the residual power level of the first electrical source equal to the first target amount without performing a transmittance of the electrical power between the first and second electrical sources.

For example, if the first electrical source is the battery and the second electrical source is the capacitor, the capacity of the second electrical source is smaller than the capacity of the first electrical source by about single order of magnitude. Thus, there is high possibility that the electrical power which is outputted from the second electrical source to the first electrical source is too small to sufficiently increase the residual power level of the first electrical source. Namely, there is high possibility that the second electrical source is not capable of outputting, to the first electrical source, the electrical power which is large to sufficiently increase the residual power level of the first electrical source. Similarly, there is high possibility that the electrical power which is inputted from the first electrical source to the second electrical source is too small to sufficiently decrease the residual power level of the first electrical source. Namely, there is high possibility that the electrical power which is large to sufficiently decrease the residual power level of the first electrical source cannot be inputted from the first electrical source to the second electrical source. This transmittance of the electrical power between the first and second electrical sources may be an unnecessary loss.

Thus, according to this aspect, the controlling device is capable of controlling the first and second electrical sources without performing the transmittance of the electrical power between the first and second electrical sources for the purpose of setting the residual power level of the first electrical source equal to the first target amount. It is possible to preventing the unnecessary loss caused by the transmittance of the electrical power between the first and second electrical sources which cannot sufficiently increase or decrease the residual power level of the first electrical source.

Incidentally, the controlling device may control the first and second electrical sources to perform the transmittance of the electrical power between the first and second electrical sources for the purpose of setting the residual power level of the second electrical source equal to the second target amount. However, the transmittance of the electrical power between the first and second electrical sources which is performed for the purpose of setting the residual power level of the second electrical source equal to the second target amount sometimes becomes the transmittance of the electrical power between the first and second electrical sources which is performed for the purpose of setting the residual power level of the first electrical source equal to the first target amount. Even in this case, the controlling device may control the first and second electrical sources to perform the transmittance of the electrical power between the first and second electrical sources, if the main purpose is different from the purpose of setting the residual power level of the first electrical source equal to the first target amount.

<7>

In another aspect of the electrical source control apparatus which sets the residual power level of the first electrical source equal to the first target amount without performing the transmittance of the electrical power between the first and second electrical sources, the controlling device controls the first and second electrical sources to set the residual power level of the first electrical source equal to the first target amount without performing the transmittance of the electrical power between the first and second electrical sources, if the residual power level of the first electrical source is not equal to the first target amount and the residual power level of the second electrical source is equal to the second target amount.

According to this aspect, the controlling device is capable of controlling the first and second electrical sources without performing the transmittance of the electrical power between the first and second electrical sources for the purpose of setting the residual power level of the first electrical source equal to the first target amount. It is possible to preventing the unnecessary loss caused by the transmittance of the electrical power between the first and second electrical sources which cannot sufficiently increase or decrease the residual power level of the first electrical source.

An operation and another advantage of the present invention will become more apparent from the embodiments explained below.

DESCRIPTION OF EMBODIMENTS

Hereinafter, with reference to drawings, an embodiment in which the present invention is applied to a vehicle 1 which has a motor generator 10 will be explained as one example of the embodiment of the present invention.

(1) Structure of Vehicle

Figure 1:
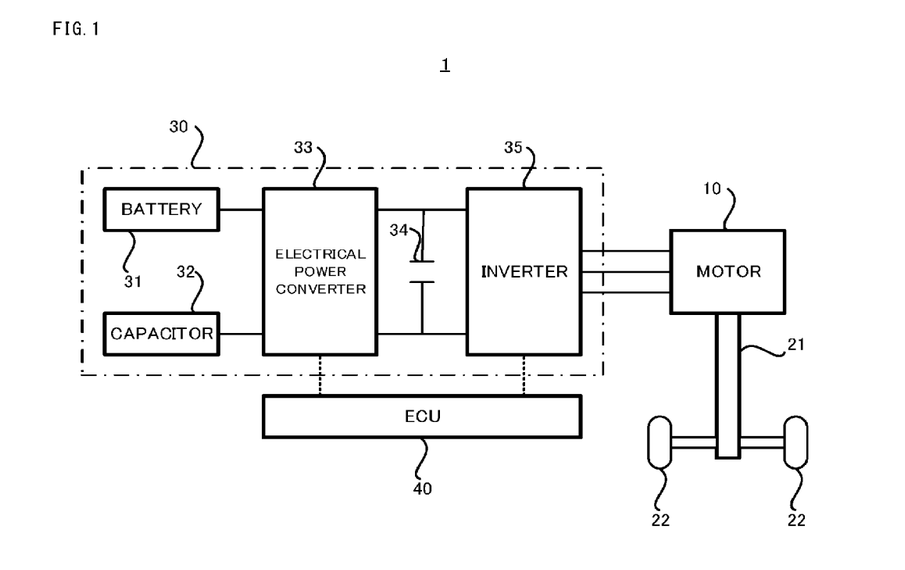
FIG. 1 is a block diagram illustrating one example of a structure of a vehicle of a present embodiment.

Firstly, with reference to FIG. 1, the structure of the vehicle 1 of the present embodiment will be explained. FIG. 1 is a block diagram illustrating one example of the structure of the vehicle 1 of the present embodiment.

As illustrated in FIG. 1, the vehicle 1 has a motor generator 10, an axle shaft 21, wheels 22, an electrical source system 30 and an ECU 40 which is one example of the "electrical source control apparatus (namely, the controlling device and the setting device)".

The motor generator 10 operates by using an electrical power outputted from the electrical source system 30 to function as a motor for supplying a driving power (namely, a driving power which is required for the vehicle 1 to travel) to the axle shaft 21, when the vehicle 1 is in a power running state. Furthermore, the motor generator 10 functions as a generator for charging a battery 31 and a capacitor 32 in the electrical source system 30, when the vehicle 1 is in a regeneration state.

The axle shaft 21 is a transmission shaft for transmitting the driving power outputted from the motor generator 10 to the wheels 22.

The wheels 22 transmits the driving power transmitted via the axle shaft 21 to a road. FIG. 1 illustrates an example in which the vehicle 1 has one wheel 22 at each of right and left sides. However, it is actually preferable that the vehicle 1 have one wheel 22 at each of a front-right side, a front-left side, a rear-right side and a rear-left side (namely, have four wheels 22 in total).

Incidentally, FIG. 1 illustrates, as an example, the vehicle 1 which is provided with one motor generator 10. However, the vehicle 1 may be provided with two or more motor generators 10. Furthermore, the vehicle 1 may be provided with an engine in addition to the motor generator 10. Namely, the vehicle 1 in the present embodiment may be an EV (Electrical Vehicle) or a HV (Hybrid Vehicle).

The electrical source system 30 outputs the electrical power, which is required for the motor generator 10 to function as the motor, to the motor generator 10, when the vehicle 1 is in the power running state. Furthermore, the electrical power which is generated by the motor generator 10 functioning as the generator is inputted from the motor generator 10 to the electrical source system 30, when the vehicle 1 is in the regeneration state.

This electrical source system 30 is provided with the battery 31 which is one example of the "first electrical source", the capacitor 32 which is one example of the "second electrical source", an electrical power converter 33, a smoothing condenser 34 and an inverter 35.

The battery 31 is a secondary battery which is capable of performing an input/output (namely, charge/discharge) of the electrical power by using an electrochemical reaction (namely, a reaction for converting a chemical energy to an electrical energy) and the like. A lead battery, a lithium-ion battery, a nickel-hydrogen battery, a fuel battery or the like is one example of the battery 31, for example.

The capacitor 32 is capable of performing an input/output of the electrical power by using a physical effect or a chemical effect for storing electrical charge (namely, an electrical energy). An electrical double layer capacitor or the like is one example of the capacitor 32, for example.

Incidentally, two types of any electrical sources which is capable of performing the input/output of the electrical power may be used, instead of the battery 31 and the capacitor 32. In this case, the electrical source which is used instead of the battery 31 may be an electrical source whose capacity is larger (alternatively, whose energy density is larger) than that of the electrical source which is used instead of the capacitor 32. Alternatively, the electrical source which is used instead of the battery 31 may be an electrical source which is capable of outputting a constant electrical power over a longer time than the electrical source which is used instead of the capacitor 32. Moreover, the electrical source which is used instead of the capacitor 32 may be an electrical source whose output is larger than that of the electrical source which is used instead of the battery 31. Alternatively, the electrical source which is used instead of the capacitor 32 may be an electrical source which is capable of performing the input/output of the electrical power more rapidly (drastically) than the electrical source which is used instead of the battery 31. A high capacity type battery (namely, the electrical source which is used instead of the battery 31) and a high output type battery (namely, the electrical source which is used instead of the capacitor 32) or a high capacity type capacitor (namely, the electrical source which is used instead of the battery 31) and a high output type capacitor (namely, the electrical source which is used instead of the capacitor 32) are one example of two types of the electrical sources, for example.

The electrical power converter 33 converts the electrical power which is outputted from the battery 31 and the electrical power which is outputted from the capacitor 32 depending on a required electrical power which is required for the electrical source system 30 (typically, the required electrical power is an electrical power which the electrical source system 30 should output to the motor generator 10, for example), under the control of the ECU 40. The electrical power converter 33 outputs the converted electrical power to the inverter 35. Furthermore, the electrical power converter 33 converts the electrical power which is inputted from the inverter 35 (namely, the electrical power which is generated by the regeneration of the motor generator 10) depending on the required electrical power which is required for the electrical source system 30 (typically, the required electrical power is an electrical power which should be inputted to the electrical source system 30, and the required electrical power is substantially an electrical power which should be inputted to the battery 31 and the capacitor 32, for example), under the control of the ECU 40. The electrical power converter 33 outputs the converted electrical power to at least one of the battery 31 and the capacitor 32. The above described electrical power conversion allows the electrical power converter 33 to distribute the electrical power among the battery 31, the capacitor 32 and the inverter 35.

Incidentally, FIG. 1 illustrate, as an example, the electrical source system 30 having single electrical power converter 33 which is shared by the battery 31 and the capacitor 32. However, the electrical source system 30 may be provided with two or more electrical power converters 33 (for example, the electrical power converter 33 for the battery 31 and the electrical power converter 33 for the capacitor 32).

The smoothing condenser 34 smoothes the variation of the electrical power which is supplied from the electrical power converter 33 to the inverter 35 (substantially, the variation of the electrical voltage at a source line between the electrical power converter 33 and the inverter 35), when the vehicle 1 is in the power running state. The smoothing condenser 34 similarly smoothes the variation of the electrical power which is supplied to the electrical power converter 33 from the inverter 35 (substantially, the variation of the electrical voltage at the source line between the electrical power converter 33 and the inverter 35), when the vehicle 1 is in the regeneration state.

The inverter 35 converts the electrical power (DC (direct current) electrical power), which is outputted from the electrical power converter 33, to an AC (alternating current) electrical power, when the vehicle 1 is in the power running state. Then, the inverter 35 supplies the electrical power, which is converted to the AC electrical power, to the motor generator 10. Furthermore, the inverter 35 converts the electrical power (AC electrical power), which is generated by the motor generator 10, to the DC electrical power. Then, the inverter 35 supplies the electrical power, which is converted to the DC electrical power, to the electrical power converter 33.

The ECU 40 is an electrical controlling unit which is configured to control the whole of the operation of the vehicle 1. The ECU 40 is provided with a CPU (Central Processing Unit), a ROM (Read Only Memory), a RAM (Random Access Memory) and so on.

Especially, the ECU 40 controls the distribution of the electrical power which is performed by the above described electrical power converter 33. More specifically, the ECU 40 controls the distribution of the electrical power to set a SOC (State Of Charge) of the battery 31 equal to a battery SOC center which is one example of the "first target amount" and to set a SOC of the capacitor 32 equal to a capacitor SOC center which is one example of the "second target amount". In this case, the ECU 40 may set the SOC of the battery 31 equal to the battery SOC center by controlling the electrical power converter 33 such that the electrical power is outputted from the battery 31 to the capacitor 32 or the motor generator 10 or the electrical power is inputted from the motor generator 10 to the battery 31. The ECU 40 may similarly set the SOC of the capacitor 32 equal to the capacitor SOC center by controlling the electrical power converter 33 such that the electrical power is outputted from the capacitor 32 to the battery 31 or the motor generator 10 or the electrical power is inputted from the battery 31 or the motor generator 10 to the capacitor 32.

Hereinafter, a control operation (hereinafter, it is referred to as a "SOC center control operation") which is performed under the control of the ECU 40 and which is for setting the SOC of the battery 31 equal to the battery SOC center and for setting the SOC of the capacitor 32 equal to the capacitor SOC center will be explained in detail.

(2) SOC Center Control Operation for Battery and Capacitor

Figure 2:
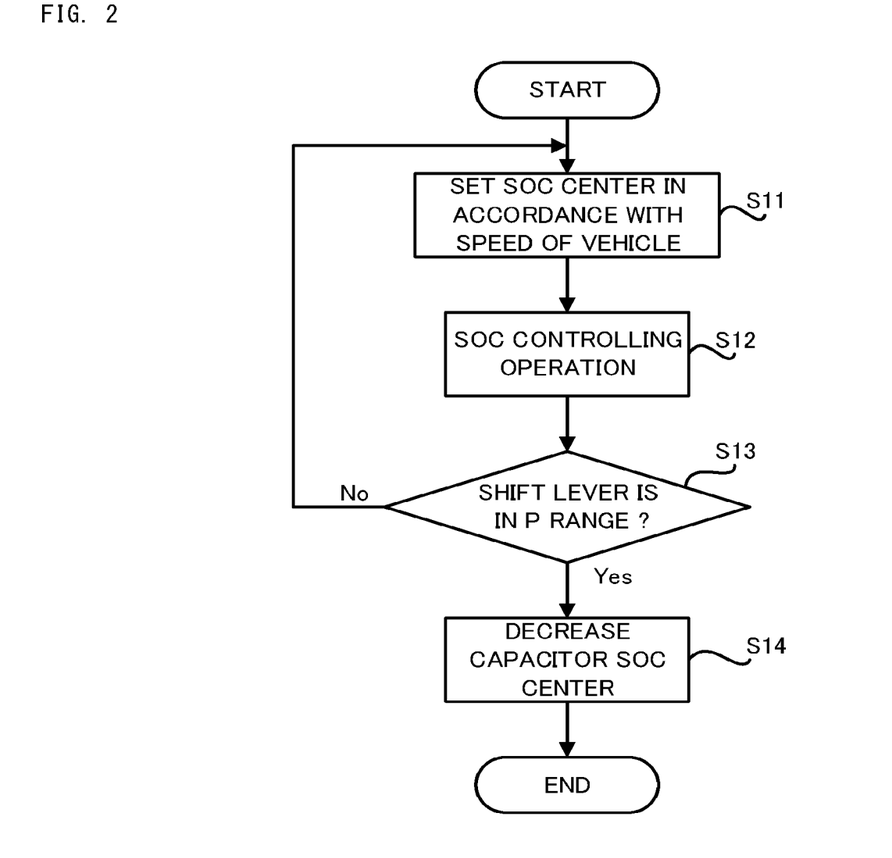
FIG. 2 is a flowchart illustrating an entire flow of the control operation of the vehicle in the present embodiment (substantially, the control operation of the electrical source system, and the SOC center control operation for the battery and the capacitor).

Next, with reference to FIG. 2, the control operation of the vehicle 1 in the present embodiment (substantially, the control operation of the electrical source system 30, and the SOC center control operation for the battery 31 and the capacitor 32) will be explained. FIG. 2 is a flowchart illustrating an entire flow of the control operation of the vehicle 1 in the present embodiment (substantially, the control operation of the electrical source system 30, and the SOC center control operation for the battery 31 and the capacitor 32).

As illustrated in FIG. 2, the ECU 40 sets the battery SOC center which is a target amount used in performing the SOC center control operation for the battery 31 (step S11). The ECU 40 sets the capacitor SOC center which is a target amount used in performing the SOC center control operation for the capacitor (step S11). Specifically, the ECU 40 sets each of the battery SOC center and the capacitor SOC center in accordance with a speed of the vehicle 1. Therefore, it is preferable that the ECU 40 obtain the speed of the vehicle 1 which is detected by a non-illustrated speed sensor or the like.

Figure 3:
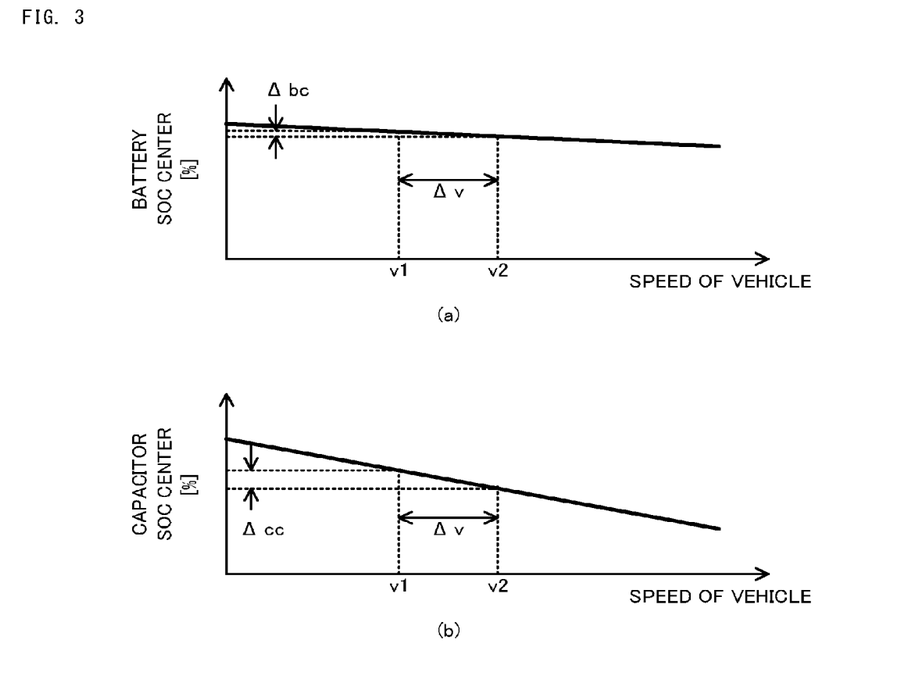
FIG. 3 is a graph illustrating a relationship between the speed of the vehicle and each of the battery SOC center and the capacitor SOC center.

Here, with reference to FIG. 3, an operation of setting each of the battery SOC center and the capacitor SOC center in accordance with the speed of the vehicle 1 will be explained. FIG. 3 are graphs illustrating a relationship between the speed of the vehicle 1 and each of the battery SOC center and the capacitor SOC center.

As illustrated in FIG. 3(*a*), it is preferable that the ECU 40 set (in other words, adjust) the battery SOC center such that the battery SOC center becomes smaller as the speed of the vehicle 1 becomes larger. In this case, the ECU 40 may set the battery SOC center by referring to the graph (alternatively, a map, a table or the like) illustrated in FIG. 3(*a*).

As illustrated in FIG. 3(*b*), it is preferable that the ECU 40 similarly set (in other words, adjust) the capacitor SOC center such that the capacitor SOC center becomes smaller as the speed of the vehicle 1 becomes larger. In this case, the ECU 40 may set the capacitor SOC center by referring to the graph (alternatively, a map, a table or the like) illustrated in FIG. 3(*b*).

Especially in the present embodiment, a rate of change of the capacitor SOC center to the speed of the vehicle 1 is different from a rate of change of the battery SOC center to the speed of the vehicle 1, as can be seen from a comparison of between the graph of FIG. 3(*a*) and the graph of FIG. 3(*b*). More specifically, the rate of the change of the capacitor SOC center to the speed of the vehicle 1 is larger than the rate of the change of the battery SOC center to the speed of the vehicle 1. In other words, a decreased amount $\Delta cc$ of the capacitor SOC center in the case where the speed of the vehicle 1 changes from v1 to v2 (namely, the speed of the vehicle 1 increases by a predetermined amount $\Delta v$ (=v2−v1) is larger than a decreased amount $\Delta bc$ of the battery SOC center in the case where the speed of the vehicle 1 changes from v1 to v2 (namely, the speed of the vehicle 1 increases by the predetermined amount $\Delta v$.

As a result, the ECU 40 sets the batter SOC center and the capacitor SOC center such that the capacitor SOC center becomes smaller more rapidly (alternatively, drastically or exponentially) as the speed of the vehicle 1 becomes larger and the battery SOC center becomes smaller more slowly as the speed of the vehicle becomes larger Again in FIG. 2, then, the ECU 40 performs the SOC center control operation for the battery 31 and the capacitor 32 (step S12). Specifically, the ECU 40 controls an input/output of the electrical power to/from the battery 31 and the capacitor 32 (substantially, controls the distribution of the electrical power performed by the electrical power converter 33) to set the SOC of the battery 31 equal to the battery SOC center which is set at the step S11. The ECU 40 similarly controls the input/output of the electrical power to/from the battery 31 and the capacitor 32 (substantially, controls the distribution of the electrical power performed by the electrical power converter 33) to set the SOC of the capacitor 32 equal to the capacitor SOC center which is set at the step S11.

More specifically, if the SOC of the battery 31 is smaller than the battery SOC center, the ECU 40 controls the distribution of the electrical power performed by the electrical power converter 33 such that the electrical power is inputted to the battery 31 (namely, the battery 31 is charged). As a result, the SOC of the battery 31 increases, and thus the ECU 40 is capable of setting the SOC of the battery 31 equal to the battery SOC center.

Similarly, if the SOC of the battery 31 is larger than the battery SOC center, the ECU 40 controls the distribution of the electrical power performed by the electrical power converter 33 such that the electrical power is outputted from the battery 31 (namely, the battery 31 discharges). As a result, the SOC of the battery 31 decreases, and thus the ECU 40 is capable of setting the SOC of the battery 31 equal to the battery SOC center.

Similarly, if the SOC of the capacitor 32 is smaller than the capacitor SOC center, the ECU 40 controls the distribution of the electrical power performed by the electrical power converter 33 such that the electrical power is inputted to the capacitor 32 (namely, the capacitor 32 is charged). As a result, the SOC of the capacitor 32 increases, and thus the ECU 40 is capable of setting the SOC of the capacitor 32 equal to the capacitor SOC center.

Similarly, if the SOC of the capacitor 32 is larger than the capacitor SOC center, the ECU 40 controls the distribution of the electrical power performed by the electrical power converter 33 such that the electrical power is outputted from the capacitor 32 (namely, the capacitor 32 discharges). As a result, the SOC of the capacitor 32 decreases, and thus the ECU 40 is capable of setting the SOC of the capacitor 32 equal to the capacitor SOC center.

Figure 4:
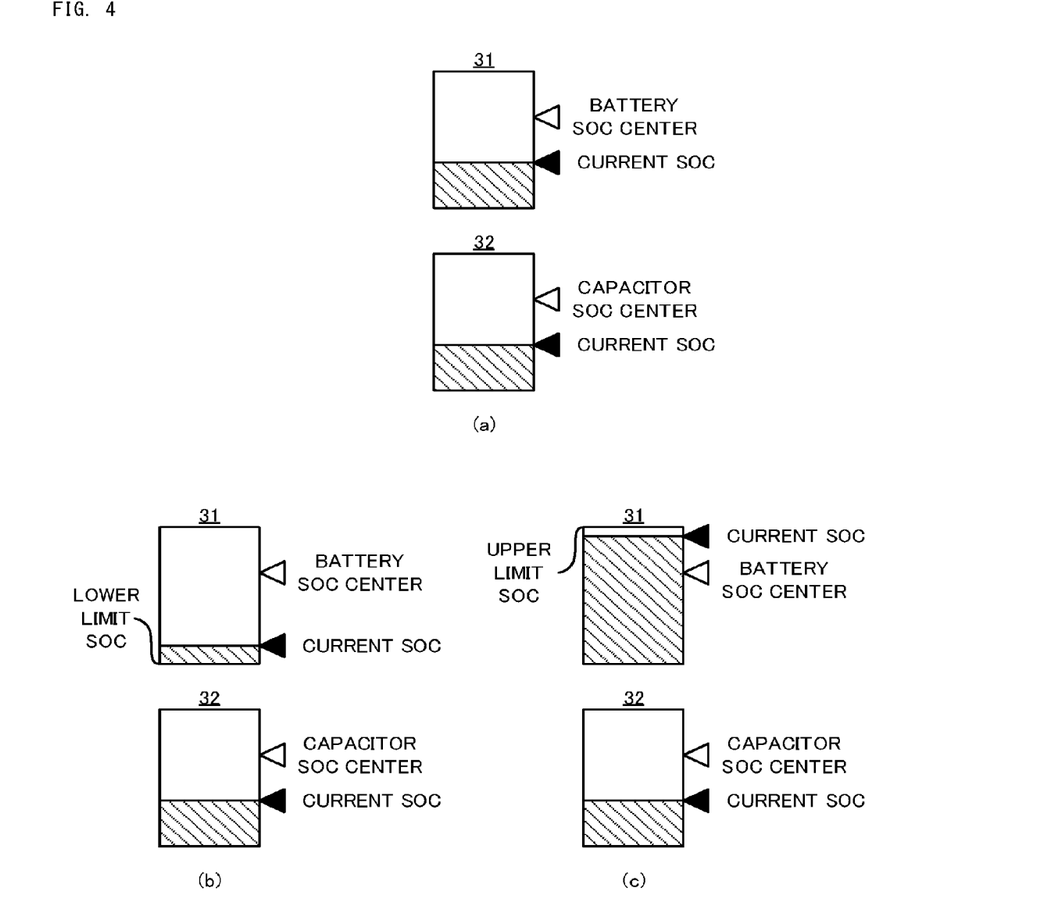
FIG. 4 are graphs illustrating a relationship between the SOC of the battery and the battery SOC center and a relationship between the SOC of the capacitor and the capacitor SOC center.

In this case, it is preferable that the ECU 40 perform the SOC center control for the capacitor 32 more preferentially than the SOC center control for the battery 31, if the SOC of the battery 31 is not equal to the battery SOC center and the SOC of the capacitor 32 is not equal to the capacitor SOC center. This control aspect will be explained with reference to FIG. 4. FIG. 4 are graphs illustrating a relationship between the SOC of the battery 31 and the battery SOC center and a relationship between the SOC of the capacitor 32 and the capacitor SOC center.

FIG. 4(*a*) illustrates a case where the SOC of the battery 31 is smaller than the battery SOC center and the SOC of the capacitor 32 is smaller than the capacitor SOC center. In this case, the ECU 40 may perform the SOC center control for the capacitor 32 without performing the SOC center control for the battery 31.

For example, the ECU 40 may control the distribution of the electrical power performed by the electrical power converter 33 such that the electrical power which is generated by the regeneration is inputted to the capacitor 32. Alternatively, the ECU 40 may control the distribution of the electrical power performed by the electrical power converter 33 such that the battery 31 outputs the electrical power to the capacitor 32. Namely, the ECU 40 may preferentially perform the SOC center control for the capacitor 32 while allowing the SOC of the battery 31, which should increase to be equal to the battery SOC center, to further decrease.

As a result, the SOC of the capacitor 32 increases and thus the ECU 40 is capable of setting the SOC of the capacitor 32 equal to the capacitor SOC center. After the SOC of the capacitor 32 is set to be equal to the capacitor SOC center, the ECU 40 may perform the SOC center control for the battery 31.

Incidentally, same applies to a case where the SOC of the battery 31 is larger than the battery SOC center and the SOC of the capacitor 32 is larger than the capacitor SOC center. Same applies to a case where the SOC of the battery 31 is smaller than the battery SOC center and the SOC of the capacitor 32 is larger than the capacitor SOC center. Same applies to a case where the SOC of the battery 31 is larger than the battery SOC center and the SOC of the capacitor 32 is smaller than the capacitor SOC center.

However, as illustrated in FIG. 4(*b*), even if the SOC of the battery 31 is not equal to the battery SOC center and the SOC of the capacitor 32 is not equal to the capacitor SOC center, if a difference between the SOC of the battery 31 and a lower limit SOC is equal to or less than a predetermined threshold value, it is preferable that the ECU 40 perform the SOC center control for the battery 31 more preferentially than the SOC center control for the capacitor 32. Similarly, as illustrated in FIG. 4(*c*), even if the SOC of the battery 31 is not equal to the battery SOC center and the SOC of the capacitor 32 is not equal to the capacitor SOC center, if a difference between the SOC of the battery 31 and an upper limit SOC is equal to or less than a predetermined threshold value, it is preferable that the ECU 40 perform the SOC center control for the battery 31 more preferentially than the SOC center control for the capacitor 32. In this case, the ECU 40 may perform the SOC center control for the battery 31 without performing the SOC center control for the capacitor 32. As a result, a depletion of the battery 31 or a shortage of a space of the battery 31 for additional charge is appropriately prevented.

Incidentally, it is preferable that each of the upper limit SOC and the lower limit SOC be a limiting value which is set from a viewpoint of realizing a normal or steady operation of the electrical source system 30, for example. The upper limit SOC and the lower limit SOC may be fixed values or variable values which are updated during the travel.

Moreover, it is preferable that the predetermined threshold value be set to an appropriate value which can distinguish a relationship of the priority between the SOC center control for the battery 31 and the SOC center control for the capacitor 32 from a viewpoint of realizing the normal or steady operation of the electrical source system 30, while a specification of the electrical source system 30 (especially, specifications of the battery 31 and the capacitor 32) is considered.

Figure 5:
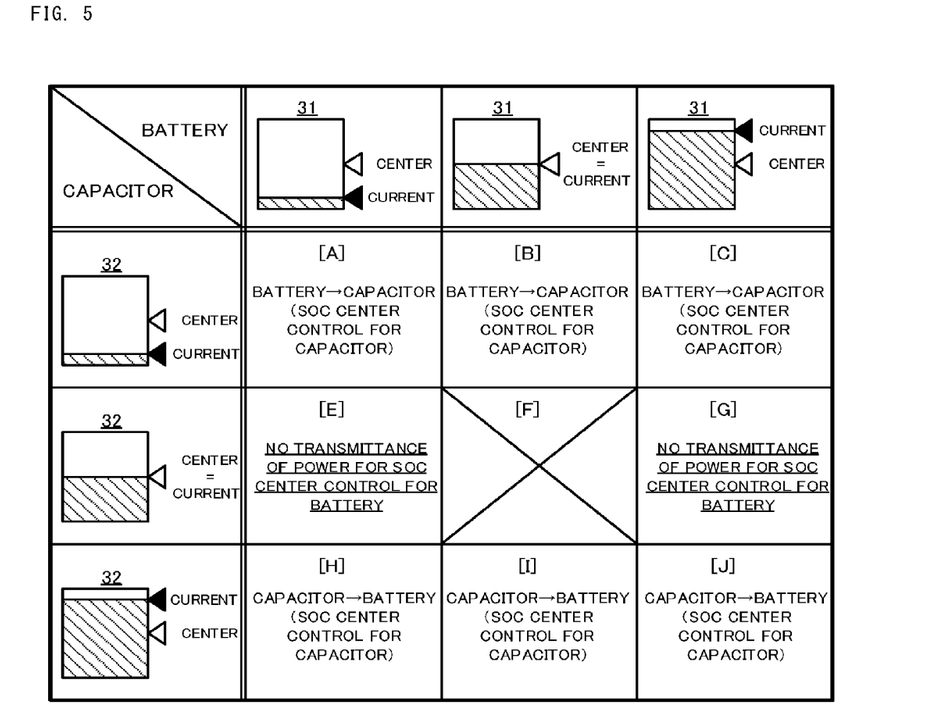
FIG. 5 is a table illustrating specific aspects of the SOC center control which can be used in accordance with a relationship between the SOC of the battery 31 and the battery SOC center and a relationship between the SOC of the capacitor 32 and the capacitor SOC center.

Again in FIG. 2, it is preferable that the ECU 40 perform the SOC center control for the battery 31 with considering that the capacity of the battery 31 is larger than the capacity of the capacitor 32. Specifically, it is preferable that the ECU 40 does not use the electrical power of the capacitor 32 to perform the SOC center control for the battery 31. This control aspect will be explained with reference to FIG. 5. FIG. 5 is a table illustrating specific aspects of the SOC center control which can be used in accordance with a relationship between the SOC of the battery 31 and the battery SOC center and a relationship between the SOC of the capacitor 32 and the capacitor SOC center.

A case E in FIG. 5 illustrate a case where the SOC of the battery 31 is smaller than the battery SOC center and the SOC of the capacitor 32 is equal to the capacitor SOC center. In this case, it is preferable that the ECU 40 increase the SOC of the battery 31 by controlling the distribution of the electrical power performed by the electrical power converter 33 such that any electrical power source outputs the electrical power to the battery 31.

Here, the capacitor 32 could be one example of any electrical power source. However, the capacity of the capacitor 32 is smaller than the capacity of the battery 31 by about single order of magnitude. Therefore, there is high possibility that the electrical power which is outputted from the capacitor 32 to the battery 31 is too small to sufficiently increase the SOC of the battery 31. Namely, there is high possibility that the capacitor 32 is not capable of outputting, to the battery 31, the electrical power which is large to sufficiently increase the SOC of the battery 31. As a result, the electrical power which is outputted from the capacitor 32 to the battery 31 to perform the SOC center control for the battery 31 possibly becomes an unnecessary loss.

Thus, in the case E in FIG. 5, the ECU 40 does not use the electrical power of the capacitor 32 to perform the SOC center control for the battery 31. In this case, the ECU 40 may control the distribution of the electrical power performed by the electrical power converter 33 such that the electrical power which the motor generator 10 generates by the regeneration is outputted to the battery 31, for example. As a result, there is no or little possibility that the electrical power which is outputted from the capacitor 32 to the battery 31 to perform the SOC center control for the battery 31 becomes the unnecessary loss Similarly, a case G in FIG. 5 illustrate a case where the SOC of the battery 31 is larger than the battery SOC center and the SOC of the capacitor 32 is equal to the capacitor SOC center. In this case, it is preferable that the ECU 40 decrease the SOC of the battery 31 by controlling the distribution of the electrical power performed by the electrical power converter 33 such that the battery 31 outputs the electrical power to any load.

Here, the capacitor 32 could be one example of any load. However, the capacity of the capacitor 32 is smaller than the capacity of the battery 31 by about single order of magnitude. Therefore, there is high possibility that the electrical power which is outputted from the battery 31 to the capacitor 32 is too small to sufficiently decrease the SOC of the battery 31. Namely, there is high possibility that the electrical power which is large to sufficiently decrease the SOC of the battery 31 cannot be outputted from the battery 31 to the capacitor 32. As a result, the electrical power which is outputted from the battery 31 to the capacitor 32 to perform the SOC center control for the battery 31 possibly becomes an unnecessary loss.

Thus, in the case G in FIG. 5, the ECU 40 does not use the electrical power of the capacitor 32 to perform the SOC center control for the battery 31. In this case, the ECU 40 may control the distribution of the electrical power performed by the electrical power converter 33 such that the battery 31 outputs the electrical power to the motor generator 10, for example. As a result, there is no or little possibility that the electrical power which is outputted from the battery 31 to the capacitor 32 to perform the SOC center control for the battery 31 becomes the unnecessary loss Incidentally, cases other than the cases E and G will be explained for reference.

As illustrated in a case A in FIG. 5, if the SOC of the battery 31 is smaller than the battery SOC center and the SOC of the capacitor 32 is smaller than the capacitor SOC center, the ECU 40 preferentially performs the SOC center control for the capacitor 32. Namely, the ECU 40 may control the distribution of the electrical power performed by the electrical power converter 33 such that the battery 31 (alternatively, the motor generator 10) outputs the electrical power to the capacitor 32. After the SOC of the capacitor 32 is set to be equal to the capacitor SOC center, the ECU 40 may perform the SOC center control for the battery 31.

As illustrated in a case b in FIG. 5, if the SOC of the battery 31 is equal to the battery SOC center and the SOC of the capacitor 32 is smaller than the capacitor SOC center, the ECU 40 performs the SOC center control for the capacitor 32. Namely, the ECU 40 may control the distribution of the electrical power performed by the electrical power converter 33 such that the battery 31 (alternatively, the motor generator 10) outputs the electrical power to the capacitor 32.

As illustrated in a case C in FIG. 5, if the SOC of the battery 31 is larger than the battery SOC center and the SOC of the capacitor 32 is smaller than the capacitor SOC center, the ECU 40 preferentially performs the SOC center control for the capacitor 32. Namely, the ECU 40 may control the distribution of the electrical power performed by the electrical power converter 33 such that the battery 31 (alternatively, the motor generator 10) outputs the electrical power to the capacitor 32. After the SOC of the capacitor 32 is set to be equal to the capacitor SOC center, the ECU 40 may perform the SOC center control for the battery 31.

As illustrated in a case F in FIG. 5, if the SOC of the battery 31 is equal to the battery SOC center and the SOC of the capacitor 32 is equal to the capacitor SOC center, the ECU 40 may not perform the SOC center control.

As illustrated in a case H in FIG. 5, if the SOC of the battery 31 is smaller than the battery SOC center and the SOC of the capacitor 32 is larger than the capacitor SOC center, the ECU 40 preferentially performs the SOC center control for the capacitor 32. Namely, the ECU 40 may control the distribution of the electrical power performed by the electrical power converter 33 such that the capacitor 32 outputs the electrical power to the battery 31 (alternatively, the motor generator 10). After the SOC of the capacitor 32 is set to be equal to the capacitor SOC center, the ECU 40 may perform the SOC center control for the battery 31.

As illustrated in a case I in FIG. 5, if the SOC of the battery 31 is equal to the battery SOC center and the SOC of the capacitor 32 is larger than the capacitor SOC center, the ECU 40 performs the SOC center control for the capacitor 32. Namely, the ECU 40 may control the distribution of the electrical power performed by the electrical power converter 33 such that the capacitor 32 outputs the electrical power to the battery 31 (alternatively, the motor generator 10).

As illustrated in a case J in FIG. 5, if the SOC of the battery 31 is larger than the battery SOC center and the SOC of the capacitor 32 is larger than the capacitor SOC center, the ECU 40 preferentially performs the SOC center control for the capacitor 32. Namely, the ECU 40 may control the distribution of the electrical power performed by the electrical power converter 33 such that the capacitor 32 outputs the electrical power to the battery 31 (alternatively, the motor generator 10). After the SOC of the capacitor 32 is set to be equal to the capacitor SOC center, the ECU 40 may perform the SOC center control for the battery 31.

Again in FIG. 2, the ECU 40 determines whether or not a range of a shift lever which is used to operate a transmission is changed to a P range from another range (for example, a D range, a R range, a N range) other than the P range while performing the SOC center control (step S13).

As a determination at the step S13, if it is not determined that the range of the shift lever is changed to the P range (step S13: No), the ECU 40 repeats the operation after the step S11.

On the other hand, at the determination at the step S13, if it is determined that the range of the shift lever is changed to the P range (step S13: Yes), it is predicted that there is relative high possibility that the vehicle 1 stops traveling. Namely, it is predicted that there is relative high possibility that the electrical source system 30 stops operating. In this case, the ECU 40 sets the capacitor SOC center smaller than the capacitor SOC center used in the case where it is not determined that the range of the shift lever is changed to the P range (step S14).

Figure 6:
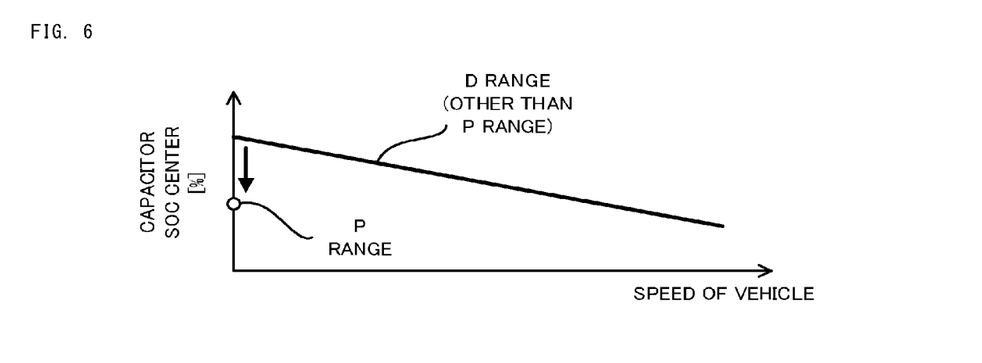
FIG. 6 is a graph illustrating a relationship between the speed of the vehicle and the capacitor SOC center for each range of the shift lever.

Here, with reference to FIG. 6, an operation of setting the capacitor SOC center smaller than the capacitor SOC center used in the case where it is not determined that the range of the shift lever is changed to the P range will be explained. FIG. 6 is a graph illustrating a relationship between the speed of the vehicle 1 and the capacitor SOC center for each range of the shift lever.

As illustrated in FIG. 6, the capacitor SOC center used in the case where it is determined that the range of the shift lever is changed to the P range is smaller than the capacitor SOC center used in the case where it is not determined that the range of the shift lever is changed to the P range (for example, in the case where the range of the shift lever is the D range). Incidentally, there is a high possibility that the speed of the vehicle 1 is zero at the timing when the range of the shift lever is changed to the P range. Therefore, the capacitor SOC center used in the case where it is determined that the range of the shift lever is changed to the P range is associated with at least the speed of the vehicle 1 which is zero, as illustrated in FIG. 6. However, the capacitor SOC center used in the case where it is determined that the range of the shift lever is changed to the P range may be associated with any speed of the vehicle 1, as with the capacitor SOC center used in the case where it is not determined that the range of the shift lever is changed to the P range.

Here, there is a time lag between a timing when the range of the shift lever is changed to the P range and a timing when the electrical source system 30 actually stops operating. The reason is that a driver of the vehicle 1 often carries out an operation for issuing a ready-off command to the vehicle 1 (for example, an operation for turning off an ignition, an operation for stopping by pressing a start/stop button, or the like) after the range of the shift lever is changed to the P range. Therefore, if the capacitor SOC center decrease at the timing when the range of the shift lever is changed to the P range, the SOC of the capacitor 32 decreases before the electrical source system 30 actually stops operating. As a result, the capacitor 32 is prevented from remaining in a condition that the SOC of the capacitor 32 is relatively large (for example, the SOC of the capacitor 32 is the upper limit SOC or a difference between the SOC of the capacitor 32 and the upper limit SOC is equal to or smaller than a predetermined threshold value)

Incidentally, the operation of determining whether or not the range of the shift lever is changed to the P range corresponds to an operation of predicting before the electrical source system 30 stops operating whether or not the electrical source system 30 stops operating. Therefore, at the step S13 in FIG. 2, the ECU 40 may perform any operation which is capable of predicting whether or not the electrical source system 30 stops operating, instead of the operation of determining whether or not the range of the shift lever is changed to the P range. For example, the ECU 40 may predict whether or not the electrical source system 30 stops operating by determining whether or not the operation for issuing the ready-off command is carried out. In this case, the ECU 40 may predict that the electrical source system 30 stops operating when it is determined that the operation for issuing the ready-off command is carried out. Alternatively, the ECU 40 may predict whether or not the electrical source system 30 stops operating on the basis of current position of the vehicle 1, which can be detected from a GPS signal or the like, and a map (a geographical diagram) of a region at which the vehicle 1 travels. In this case, the ECU 40 may predict that the electrical source system 30 stops operating when it is determined that the vehicle 1 arrives at home or the vehicle 1 enters a parking.

As described above, in the present embodiment, the rate of the change of the capacitor SOC center to the speed of the vehicle 1 is larger than the rate of the change of the battery SOC center to the speed of the vehicle 1. As a result, the below described effects can be achieved.

Specifically, the capacitor SOC center becomes smaller more rapidly than the battery SOC center, when the vehicle 1 accelerates (namely, the speed of the vehicle 1 becomes larger). Thus, the ECU 40 is capable of controlling the distribution of the electrical power performed by the electrical power converter 33 such that the SOC of the capacitor 32 becomes smaller more rapidly than the SOC of the battery 31. Namely, the vehicle 1 in the present embodiment is capable of increasing (alternatively, maximizing) the electrical power which is outputted from the capacitor 32 when the vehicle 1 accelerates, compared to a vehicle in a comparison example by which the rate of the change of the capacitor SOC center is not larger than the rate of the change of the battery SOC center. In other words, in the vehicle 1 in the present embodiment, the ECU 40 is capable of increasing a ratio of the electrical power which is outputted from the capacitor 32 to the electrical power which is required for the vehicle 1 to accelerate, compared to the vehicle in the comparison example.

The ECU 40 is similarly capable of controlling the distribution of the electrical power performed by the electrical power converter 33 to maintain a condition that the SOC of the capacitor 32 is relatively small, when the vehicle 1 travels at a constant speed (namely, the speed of the vehicle 1 is relatively large and does not vary greatly). Namely, in the vehicle 1 in the present embodiment, the capacitor 32 is capable of having (keeping) more space to additionally store the electrical power, which is generated by the future regeneration after the vehicle 1 finishes traveling at the constant speed, when the vehicle 1 travels at the constant speed, compared to the vehicle in the comparison example.

Similarly, the capacitor SOC center becomes larger more rapidly than the battery SOC center, when the vehicle 1 decelerates (namely, the speed of the vehicle 1 becomes smaller). Thus, the ECU 40 is capable of controlling the distribution of the electrical power performed by the electrical power converter 33 such that the SOC of the capacitor 32 becomes larger more rapidly than the SOC of the battery 31. Namely, the vehicle 1 in the present embodiment is capable of increasing (alternatively, maximizing) the electrical power which is inputted to the capacitor 32 when the vehicle 1 decelerates (namely, the electrical power which is generated by the regeneration caused by the deceleration), compared to the vehicle in the comparison example. In other words, in the vehicle 1 in the present embodiment, the ECU 40 is capable of increasing a ratio of the electrical power which is inputted to the capacitor 32 to the electrical power which is generated by the regeneration caused by the deceleration of the vehicle 1, compared to the vehicle in the comparison example.

As described above, the vehicle 1 in the present embodiment is capable of increasing a ratio of the electrical power which the capacitor 32 inputs/outputs to the electrical power which the electrical source system 30 should input/output, especially when the speed of the vehicle 1 varies, compared to the vehicle in the comparison example. Namely, the vehicle 1 in the present embodiment is capable of using the electrical power which the capacitor 32 inputs/outputs more effectively (in other words, more preferentially or more actively), especially when the speed of the vehicle 1 varies, compared to the vehicle in the comparison example.

Here, an efficiency of the input/output of the electrical power to/from the capacitor 32 is generally better than an efficiency of the input/output of the electrical power to/from the battery 31, because the capacity of the capacitor 32 is smaller than the capacity of the battery 31 and the output of the capacitor 32 is larger than the output of the battery 31. Thus, a fuel efficiency becomes better as the ratio of the electrical power which the capacitor 32 inputs/outputs becomes larger. Thus, the vehicle 1 in the present embodiment is capable of improving the fuel efficiency of the vehicle 1, compared to the vehicle in the comparison example, because the electrical power which the capacitor 32 inputs/outputs is used more effectively.

In addition, in the present embodiment, the ECU 40 is capable of performing the SOC center control for the capacitor 32 more preferentially than the SOC center control for the battery 31. Thus, there is little possibility that the capacitor 32 is depleted (namely, the SOC of the capacitor 32 is equal to or less than the lower limit SOC) or the capacitor 32 has no space for additional charge (namely, the SOC of the capacitor 32 is equal to or more than the upper limit SOC).

Here, for example, since there is little possibility that the capacitor 32 is depleted or the capacitor 32 has no space for additional charge, the ECU 40 is capable of increasing the ratio of the electrical power which the capacitor 32 inputs/outputs to the electrical power which the electrical source system 30 should input/output depending on a driving mode of the vehicle 1. Here, as described above, the fuel efficiency of the vehicle 1 becomes better as the ratio of the electrical power which the capacitor 32 inputs/outputs to the electrical power which the electrical source system 30 should input/output becomes larger. Thus, the ECU is capable of appropriately improving the fuel efficiency of the vehicle 1 by preferentially perform the SOC center control for the capacitor 32. As a result, the vehicle 1 is capable of traveling in a driving mode by which the fuel efficiency is prioritized.

Alternatively, since there is little possibility that the capacitor 32 is depleted or the capacitor 32 has no space for additional charge, the capacity of the second electrical source can be reduced relatively. As a result, a cost, a size and the like of the capacitor 32 can be reduced. Moreover, it is preferable that the electrical power which the electrical source system 30 should output be satisfied by a temporal output of the electrical power from the capacitor 32 whose output is relatively large, when the electrical source system 30 should temporarily output a large amount of electrical power in order to satisfy a driving performance (for example, to allow the vehicle 1 to accelerate at a relatively large acceleration rate) depending on the driving mode of the vehicle 1. In this case, since the depletion of the capacitor 32 is prevented, the capacitor 32 is capable of easily outputting the electrical power to satisfy the driving performance. In other words, such a situation does not occur easily that the capacitor 32 is not capable of outputting the electrical power at the timing when the capacitor 32 should temporarily output the electrical power in accordance with the variation of the electrical power which the electrical source system 30 should output. As a result, it is possible to satisfy a characteristic which prioritizes the driving performance for a longer time. Namely, the vehicle 1 is capable of traveling in a driving mode by which the driving performance is prioritized.

The present invention can be changed, if desired, without departing from the essence or spirit of the invention which can be read from the claims and the entire specification. An electrical source control apparatus, which involves such changes, is also intended to be within the technical scope of the present invention.

DESCRIPTION OF REFERENCE CODES 1 vehicle
10 motor generator
21 axle shaft
22 wheel
30 electrical source system
31 battery
32 capacitor
33 electrical power converter
37 smoothing condenser
35 inverter
40 ECU

The invention claimed is:

1. An electrical source control apparatus for controlling a vehicle which travels by using an electrical source system including both of a first electrical source and a second electrical source whose capacity is smaller than that of the first electrical source and whose output is larger than that of the first electrical source, the electrical source control apparatus comprising a controller, the controller being programmed to:

control the first and second electrical sources to set a residual power level of the first electrical source equal to a first target amount and to set a residual power level of the second electrical source equal to a second target amount; and set each of the first and second target amounts such that each of the first and second target amounts becomes smaller as a speed of the vehicle becomes larger, wherein the controller is programmed to set each of the first and second target amounts such that a rate of change of the second target amount to the speed of the vehicle is larger than a rate of change of the first target amount to the speed of the vehicle, and the controller is programmed to control the first and second electrical sources to prioritize a control of setting the residual power level of the second electrical source equal to the second target amount over a control of setting the residual power level of the first electrical source equal to the first target amount.

2. The electrical source control apparatus according to claim 1, wherein the controller is further programmed to predict whether or not a ready-off command for stopping an operation of the vehicle is issued, and the controller is programmed to further set the second target amount such that the second target amount which is used when it is predicted that the ready-off command is issued becomes smaller than the second target amount which is used when it is not predicted that the ready-off command is issued.

3. The electrical source control apparatus according to claim 2, wherein the controller is programmed to predict that the ready-off command is issued, if a range of an operational lever for operating a transmission is changed to a P range from another range other than the P range.

4. The electrical source control apparatus according to claim 1, wherein the controller is programmed to control the first and second electrical sources to prioritize the control of setting the residual power level of the first electrical source equal to the first target amount over the control of setting the residual power level of the second electrical source equal to the second target amount, if a difference between the residual power level of the first electrical source and a limiting value of the residual power level of the first electrical source is less than a predetermined threshold value.

5. The electrical source control apparatus according to claim 1, wherein the controller is programmed to control the first and second electrical sources to set the residual power level of the first electrical source equal to the first target amount without performing a transmittance of the electrical power between the first and second electrical sources.

6. The electrical source control apparatus according to claim 5, wherein the controller is programmed to control the first and second electrical sources to set the residual power level of the first electrical source equal to the first target amount without performing the transmittance of the electrical power between the first and second electrical sources, if the residual power level of the first electrical source is not equal to the first target amount and the residual power level of the second electrical source is equal to the second target amount.

* * * * *